United States Patent
Yi et al.

(10) Patent No.: US 9,152,839 B2
(45) Date of Patent: Oct. 6, 2015

(54) METHOD AND APPARATUS FOR OPTICAL FINGERPRINT RECOGNITION USING MULTIPLE EXPOSURE

(71) Applicant: SUPREMA INC., Gyeonggi-do (KR)

(72) Inventors: Jinwook Yi, Gyeonggi-do (KR); Hochul Shin, Gyeonggi-do (KR); Kideok Lee, Gyeonggi-do (KR); BoGun Park, Gyeonggi-do (KR); Bong Seop Song, Gyeonggi-do (KR); Jae Won Lee, Gyeonggi-do (KR)

(73) Assignee: SUPREMA INC., Gyeonggi-Do (KR)

( * ) Notice: Subject to any disclaimer, the term of this patent is extended or adjusted under 35 U.S.C. 154(b) by 98 days.

(21) Appl. No.: 13/917,897

(22) Filed: Jun. 14, 2013

(65) Prior Publication Data
US 2014/0286544 A1 Sep. 25, 2014

(30) Foreign Application Priority Data
Mar. 22, 2013 (KR) ........................ 10-2013-0031057

(51) Int. Cl.
*G06K 9/00* (2006.01)

(52) U.S. Cl.
CPC ........ *G06K 9/00013* (2013.01); *G06K 9/00087* (2013.01)

(58) Field of Classification Search
None
See application file for complete search history.

(56) References Cited

U.S. PATENT DOCUMENTS 8,320,663 B2 11/2012 Bodnar et al.
2004/0228508 A1* 11/2004 Shigeta ........................ 382/124

FOREIGN PATENT DOCUMENTS

| KR | 10-2001-0035295 A | | 5/2001 |
| KR | 20010035295 | * | 5/2001 |
| KR | 10-2009-0053937 | | 5/2009 |

* cited by examiner

*Primary Examiner* — Nirav G Patel
(74) *Attorney, Agent, or Firm* — Bacon & Thomas, PLLC

(57) ABSTRACT

A method for an optical fingerprint recognition, the method includes scanning a fingerprint image separately using a multiple exposure which allows alternating a short exposure and a normal exposure; determining whether there is an inflow of external light depending on a darkness level of a fingerprint image derived from the normal exposure; and performing a fingerprint recognition using a fingerprint image derived from the short exposure or the fingerprint image derived from the normal exposure in accordance with the determination result as to the inflow of external light.

10 Claims, 4 Drawing Sheets

METHOD AND APPARATUS FOR OPTICAL FINGERPRINT RECOGNITION USING MULTIPLE EXPOSURE

RELATED APPLICATIONS

This application claims the benefit of Korean Patent Application No. 10-2013-0031057, filed on Mar. 22, 2013, which is hereby incorporated by reference as if fully set forth herein.

FIELD OF THE INVENTION

The present invention relates to a method and apparatus for an optical fingerprint recognition, and more particularly, to a method and apparatus for an optical fingerprint recognition using a multiple exposure with different exposure times such as a short exposure, a normal exposure, and others in order to build up a tolerance to external light.

BACKGROUND OF THE INVENTION

As is known, a user authentication by a fingerprint recognition is not only convenient to use but also excellent in terms of a security and cost-effectiveness and is broadly commercialized now. A device for obtaining a fingerprint input image is generally classified into an optical device using optical sensors and a semiconductor type device using semiconductor touch sensors. Of these devices, an optical sensor has a strong durability (a scratch resistance, chemical resistance, abrasion resistance, and shock resistance) and exhibits a high recognition rate due to the visibility of an image (an image resolution), and thus the optical device is more preferred.

An optical fingerprint input device using the optical sensor has an advantage in light of the visibility of the image and recognition accuracy, but it shows a shortcoming that the quality of fingerprint images fluctuates with the change in a primary intensity of radiation due to an inflow of external light, which is one of the main drawbacks.

However, in general, because part of a finger does not entirely cover a prism area in the optical fingerprint input device, the inflow of external light is inevitable. While the design of the optical system is taken into consideration to avoid the inflow of external light, when there is an inflow of the external light having a level of 10000~100000 Lux as strong as the light of the sun, which results in obtaining a fingerprint image created by an internal illumination, as well as a fingerprint image created by the external light. For these reasons, most of the optical fingerprint input devices have been developed for indoor use, and a number of constraints are required, or the indoor use is impossible if the fingerprint input devices are used in outdoor.

An Adaptive Gain Control (AGC) may be employed in order to avoid the demerit caused by the inflow of strong external light. The AGC performs a process looking for an optimal fingerprint image while reducing the exposure value of a camera.

However, it is difficult to predict the intensity of external light to flow in, and it takes much more time to perform the AGC. Further, because the exposure caused by arbitrary external light is adjusted, there may occur a fluctuation, the so-called Hunting phenomenon wherein the amount of the control does not stop to vibrate above and below a predefined value. Owing to this, it is extremely difficult to use the optical fingerprint input device in outdoor.

Further, for a scattering-type optical system, because the scattering is done in an overall area of the finger due to strong external light, it appears that an entire region of the fingerprint is saturated bright. For an absorption-type optical system, because an intensity of external light transmitted through a finger (external light received and scattered inside a hand) becomes brighter than that of the total reflection of a prism, ridges and background may be viewed in a reverse image. In the fingerprint input device, a significant problem owing to the external light is that it is difficult to determine whether or not an input image is a fingerprint image, it takes a lot of time to perform the AGC, or it is impossible for the AGC to conduct even though the AGC has been conducted to make an image quality recognizable.

SUMMARY OF THE INVENTION

In view of the above, the present invention is proposed to solve the above described problems and provides a method and apparatus for an optical fingerprint recognition, which separately scans a fingerprint image using a multiple exposure and uses one of the separately scanned fingerprint images different from each other for the fingerprint recognition depending on the inflow of external light.

The present invention will not be limited to the above, and another object to be solved, which has not been described, will be clearly understood to those skilled in the art from the following description.

In accordance with an exemplary embodiment of the present invention, there is provided a method for an optical fingerprint recognition, which includes: scanning a fingerprint image separately using a multiple exposure which allows alternating a short exposure and a normal exposure; determining whether there is an inflow of external light depending on a darkness level of a fingerprint image derived from the normal exposure; and performing a fingerprint recognition using a fingerprint image derived from the short exposure or the fingerprint image derived from the normal exposure in accordance with the determination result as to the inflow of external light.

In the exemplary embodiment, wherein said scanning a fingerprint image separately includes scanning the fingerprint image separately with the short exposure and the normal exposure within one frame.

In the exemplary embodiment, wherein said scanning a fingerprint image separately includes scanning the fingerprint image separately in an alternating fashion of the short exposure and the normal exposure in a frame unit.

In the exemplary embodiment, wherein said performing a fingerprint recognition includes straightly applying the fingerprint image derived from the short exposure to the fingerprint recognition.

In the exemplary embodiment, wherein said performing a fingerprint recognition includes synthesizing the fingerprint image derived from the short exposure and the fingerprint image derived from the normal exposure; and applying the synthesized fingerprint image to the fingerprint recognition.

In the exemplary embodiment, wherein said performing a fingerprint recognition includes defining a following exposure time using the difference between the fingerprint image derived from the short exposure and the fingerprint image derived from the normal exposure; scanning a fingerprint image newly in compliance with a scan condition taking the following exposure time; and applying the newly scanned fingerprint image to the fingerprint recognition.

In accordance with another aspect of the exemplary embodiment of the present invention, there is provided an apparatus for an optical fingerprint recognition, the apparatus includes: a fingerprint image scanning unit configured to scan a fingerprint image separately using a multiple exposure; a scan condition setting unit configured to set a scan condition allowing to alternate a short exposure and a normal exposure at the time of scanning the fingerprint image; an image determination unit configured to determine whether there is an inflow of external light depending on a darkness level of a fingerprint image derived from the normal exposure; and a fingerprint recognition module configured to perform a fingerprint recognition using a fingerprint image derived from the short exposure or the fingerprint image derived from the normal exposure in accordance with the determination result as to the inflow of external light.

In the exemplary embodiment, wherein the fingerprint image scanning unit is configured to scan the fingerprint image separately with the short exposure and the normal exposure within one frame.

In the exemplary embodiment, wherein the fingerprint image scanning unit is configured to scan the fingerprint image separately in an alternating fashion of the short exposure and the normal exposure in a frame unit.

In the exemplary embodiment, wherein the fingerprint recognition module is configured to apply straightly the fingerprint image derived from the short exposure to the fingerprint recognition.

In the exemplary embodiment, wherein the fingerprint recognition module is configured to synthesize the fingerprint image derived from the short exposure and the fingerprint image derived from the normal exposure to apply the synthesized fingerprint image to the fingerprint recognition.

In the exemplary embodiment, wherein the fingerprint recognition module is configured to define a following exposure time using the difference between the fingerprint image derived from the short exposure and the fingerprint image derived from the normal exposure and apply a newly scanned fingerprint image, that has been scanned newly by the fingerprint image scanning unit in compliance with a scan condition taking the following exposure time, to the fingerprint recognition.

In accordance with the embodiments of the present invention, a fingerprint image is scanned separately using a multiple exposure and the separately scanned fingerprint images are used for the fingerprint recognition depending on the inflow of external light.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

The advantages and features of exemplary embodiments of the present invention and methods of accomplishing them will be clearly understood from the following description of the embodiments taken in conjunction with the accompanying drawings. However, the present invention is not limited to those embodiments and may be implemented in various forms. It should be noted that the embodiments are provided to make a full disclosure and also to allow those skilled in the art to know the full scope of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification.

Hereinafter, the embodiments of the present invention will be described in detail with reference to the accompanying drawings which form a part hereof.

Before explaining the embodiments of the present invention, first, the terms of "normal exposure" and "short exposure" as used herein are defined as follows. Person's fingerprints may be classified into "dry fingerprint" and "general fingerprint" and "wet fingerprint" based on statistics for their dryness, where "general fingerprint" may commonly refer to as "a standard fingerprint". When the "dry fingerprint" or "wet fingerprint" is input for a fingerprint recognition, it is typical to increase or decrease an exposure time than usual in order to improve a recognition rate. For example, in a case where "general fingerprint" is input, the fingerprint recognition is performed using an exposure time the same as usual without adjusting the exposure time, and a scan condition taking just the exposure time is defined herein as "normal exposure". Meanwhile, the other scan condition taking an exposure time shorter than the "normal exposure" is defined as "short exposure".

As described above, the foregoing terms are defined in consideration of functions in the embodiments of the invention, and may vary in accordance with the intentions of a user or an operator or according to usual practice. Therefore, the definitions of the terms should be interpreted on the basis of the entire content of the specification.

Figure 1:
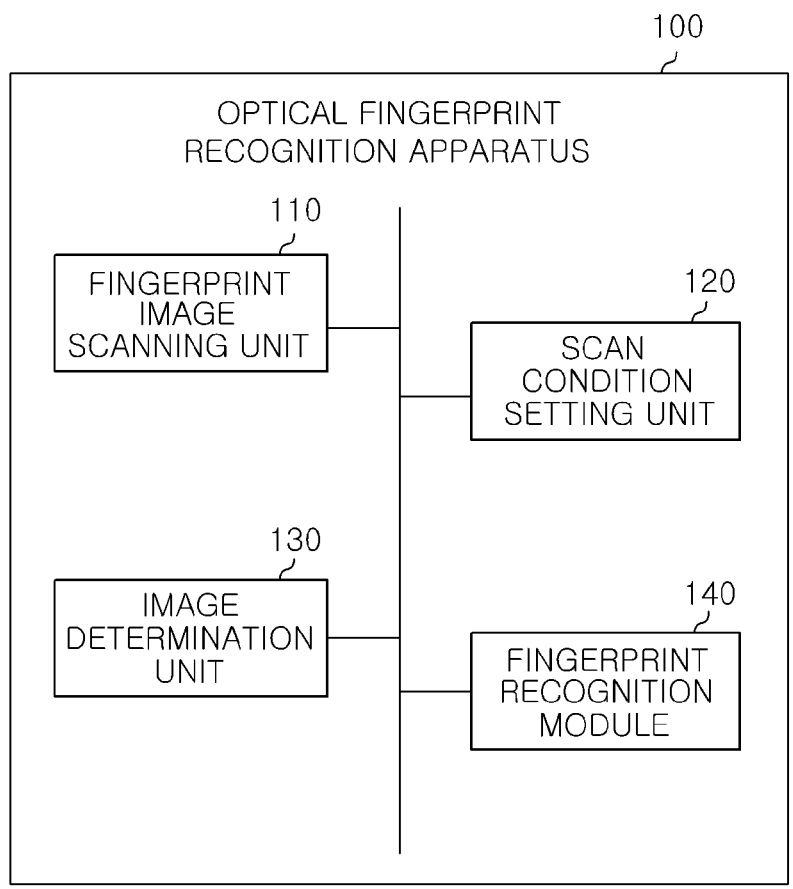
FIG. 1 is a block diagram of an optical fingerprint recognition apparatus using a multiple exposure in accordance with an embodiment of the present invention.
Figure 2:
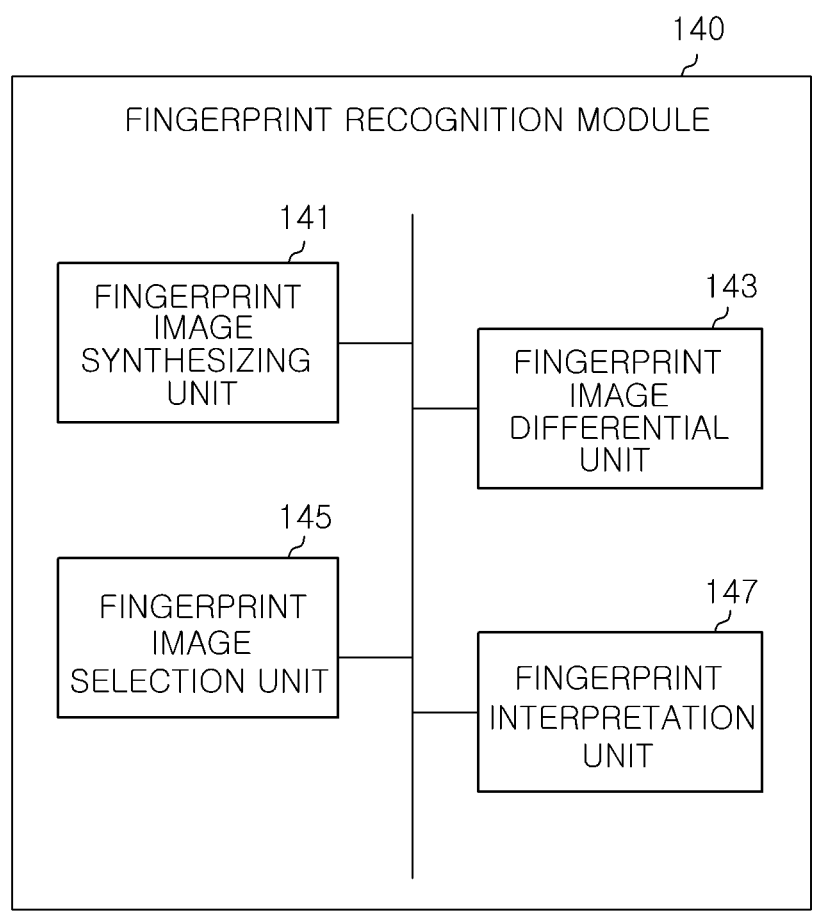
FIG. 2 is a detailed block diagram of the fingerprint recognition module shown in FIG. 1.

FIG. 1 is a block diagram of an optical fingerprint recognition apparatus using a multiple exposure in accordance with an embodiment of the present invention, and FIG. 2 is a detailed block diagram of the fingerprint recognition module shown in FIG. 1.

As illustrated in FIG. 1, the optical fingerprint recognition apparatus 100 includes a fingerprint image scanning unit 110, a scan condition setting unit 120, an image determination unit 130, and a fingerprint recognition module 140.

The fingerprint image scanning unit 110 scans a fingerprint image separately using a multiple exposure. The fingerprint image scanning unit 110 may separately scan the fingerprint image with a short exposure and a normal exposure within one frame. Alternatively, the fingerprint image scanning unit 110 may scan the fingerprint image separately in an alternating fashion of the short exposure and the normal exposure in a frame unit.

The scan condition setting unit 120 sets a scan condition which allows alternating a short exposure and a normal exposure when the fingerprint image scanning unit 110 scans the fingerprint image.

The image determination unit 130 determines whether or not there is an inflow of external light depending on a darkness level of the fingerprint image derived from the normal exposure.

The fingerprint recognition module 140 performs a fingerprint recognition using the fingerprint image derived from the short exposure or the fingerprint image derived from the normal exposure in accordance with the determination result as to the inflow of external light.

More specifically, when it is determined that there is an inflow of external light, the fingerprint recognition module 140 straightly applies the fingerprint image derived from the short exposure to a fingerprint recognition. Alternatively, when it is determined that there is an inflow of external light, the fingerprint recognition module 140 synthesizes the fingerprint image derived from the short exposure and the fingerprint image derived from the normal exposure and applies the synthesized fingerprint image to a fingerprint recognition. Alternatively, when it is determined that there is an inflow of external light, the fingerprint recognition module 140 defines a following exposure time using the difference between a fingerprint image derived from the short exposure and a fingerprint image derived from the normal exposure and applies a fingerprint image, that has been newly scanned by the fingerprint image scanning unit 110 in compliance with a scan condition taking the following exposure time, to a fingerprint recognition.

In order for an adaptive behavior to the inflow of external light, as shown in FIG. 2, the fingerprint recognition module 140 includes a fingerprint image synthesizing unit 141, a fingerprint image differential unit 143, a fingerprint image selection unit 145, and fingerprint interpretation unit 147.

The fingerprint image synthesizing unit 141 synthesizes a fingerprint image derived from the short exposure and a fingerprint image derived from the normal exposure when it is determined that the external light flows in and provides the synthesized fingerprint image to the fingerprint interpretation unit 147.

The fingerprint image differential unit 143 calculates a following exposure time using the difference between the fingerprint image derived from the short exposure and the fingerprint image derived from the normal exposure when it is determined that the external light flows in. The calculated following exposure time is then provided to the scan condition setting unit 120.

The fingerprint image selection unit 145 selects any one among the fingerprint image derived from the normal exposure, the fingerprint image derived from the short exposure, and the synthesized fingerprint image of the fingerprint images by the short exposure and the normal exposure, and the newly scanned fingerprint image derived from the calculated following exposure time in accordance with the determination result as to the inflow of external light. The selected fingerprint image is then provided to the fingerprint interpretation unit 147.

The fingerprint interpretation unit 147 performs a fingerprint interpretation and recognition with respect the fingerprint image selected by the fingerprint image selection unit 145.

Figure 3:
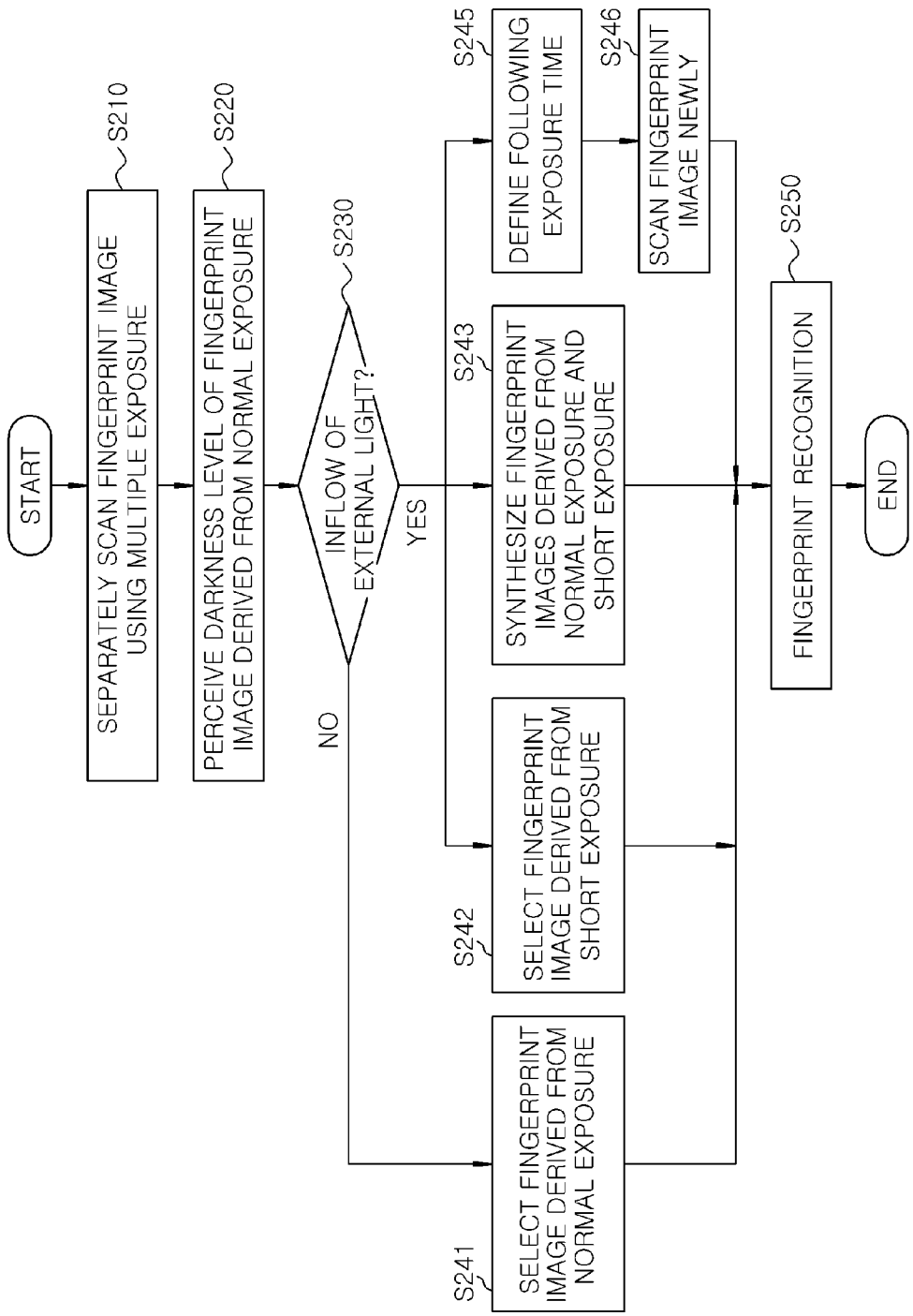
FIG. 3 is a flowchart illustrating a method for an optical fingerprint recognition using a multiple exposure in accordance with an embodiment of the present invention.

FIG. 3 is a flowchart illustrating a method for an optical fingerprint recognition using a multiple exposure in accordance with an embodiment of the present invention.

As illustrated in FIG. 3, the method for an optical fingerprint recognition using a multiple exposure includes: separately scanning a fingerprint image using a multiple exposure allowing to alternate a short exposure and a normal exposure, in operation S210; determining whether or not there is an inflow of external light depending on a darkness level of the fingerprint image derived from the normal exposure, in operation S220; and recognizing a fingerprint using a fingerprint image derived from the short exposure or a fingerprint image derived from the normal exposure in accordance with the determination result as to the inflow of external light, in operations S241 to S246, and S250.

Hereinafter, the method for an optical fingerprint recognition performed by the optical fingerprint recognition apparatus will be explained in detail with reference to FIGS. 1 to 5.

First, the scan condition setting unit 120 sets a scan condition in which an exposure time is included, and the fingerprint image scanning unit 110 scans a fingerprint image using a multiple exposure in compliance with the exposure condition which is set by the scan condition setting unit 120, in operation S210.

Figure 4:
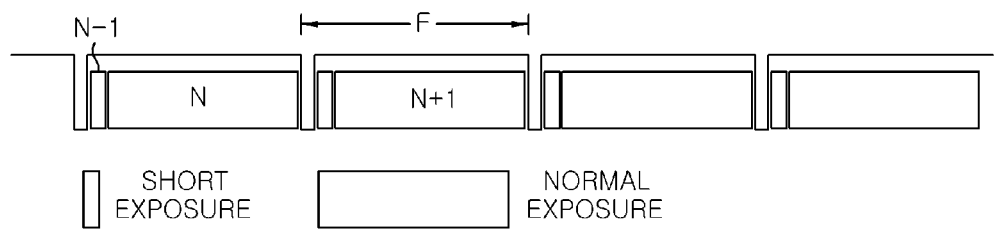
FIG. 4 shows a diagram of frames illustrating an example of a scanning process derived from a method for an optical fingerprint recognition using a multiple exposure in accordance with an embodiment of the present invention.
Figure 5:
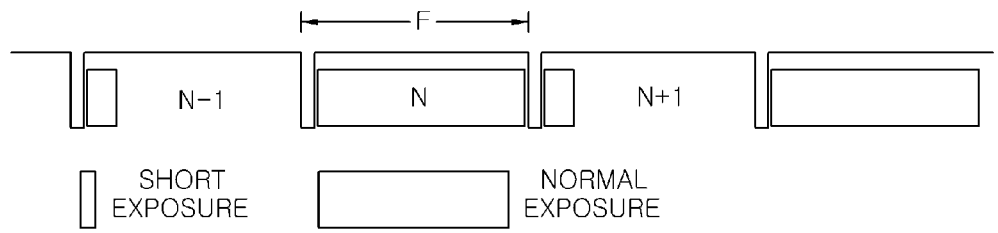
FIG. 5 shows a diagram of frames illustrating another example of a scanning process derived from a method for an optical fingerprint recognition using a multiple exposure in accordance with an embodiment of the present invention

As illustrated in FIG. 4, the fingerprint image scanning unit 110 may scan a fingerprint image with the short exposure and the normal exposure within one frame F. Alternatively, as illustrated in FIG. 5, the fingerprint image scanning unit 110 may scan a fingerprint image in an alternating fashion of the short exposure and the normal exposure in a frame (F) unit.

Subsequently, the image determination unit 130 perceives the darkness level of a fingerprint image scanned with the normal exposure through the use of the fingerprint image scanning unit 110, in operation S220, and determines whether there is an inflow of external light in accordance with a comparison result between the perceived darkness level and a predetermined darkness level, in operation S230. By way of example, the image determination unit 130 may determine that the external light flows in when the darkness level of the fingerprint image scanned with the normal exposure is lower than the predetermined darkness level.

Subsequently, when it is determined that the external light not flows in, the fingerprint image selection unit 145 in the fingerprint recognition module 140 selects the fingerprint image derived from the normal exposure 'N' and provides the selected fingerprint image to the fingerprint interpretation unit 147, in operation S241. The fingerprint interpretation unit 147 applies the fingerprint image derived from the normal exposure to a fingerprint recognition so that a fingerprint can be interpreted and recognized, in operation S250.

However, when it is determined that the external light flows in, the fingerprint image selection unit 145 in the fingerprint recognition module 140 selects a fingerprint image derived from the short exposure "N-1" and provides the selected fingerprint image to the fingerprint interpretation unit 147, in operation S242. The fingerprint interpretation unit 147 then applies the fingerprint image derived from the short exposure to a fingerprint recognition so that a fingerprint can be interpreted and recognized, in operation S250. During the fingerprint recognition, another fingerprint image will not be acquired or feed-backed in order to obtain additional information.

Alternatively, when the image determination unit 130 determines that the external light flows in, the fingerprint image synthesizing unit 141 in the fingerprint recognition module 140 synthesizes a fingerprint image derived from the short exposure 'N-1' and a fingerprint image derived from the normal exposure 'N' and the fingerprint image selection unit 145 selects a synthesized fingerprint image of the fingerprint image derived from the short exposure 'N-1' and the fingerprint image derived from the normal exposure 'N' to provide the synthesized fingerprint image to the fingerprint interpretation unit 147, in operation S243. Then, the fingerprint interpretation unit 147 applies the synthesized fingerprint image derived from both the short exposure and the normal exposure to a fingerprint recognition so that a fingerprint can be interpreted and recognized, in operation S250.

Alternatively, the image determination unit 130 determines that the external light flows in, the fingerprint image differential unit 143 in the fingerprint recognition module 140 defines a following exposure time using the difference between a fingerprint image derived from the short exposure 'N-1' and a fingerprint image derived from the normal exposure 'N' and provides the defined following exposure time to the scan condition setting unit 120, in operation S245. By way of example, the fingerprint image differential unit 143 may calculate a suitable value for the exposure time by using a lookup table. The fingerprint image scanning unit 110 then newly scans a fingerprint image in compliance with a scan condition taking the calculated following exposure time, which has been set by the scan condition setting unit 120, in operation S246; the fingerprint image selection unit 145 provides the newly scanned fingerprint image to the fingerprint interpretation unit 147; and the fingerprint interpretation unit 147 applies the newly scanned fingerprint image under the scan condition including the calculated following exposure time to a fingerprint recognition so that a fingerprint can be interpreted and recognized, in operation S250.

The combinations of the each block of the block diagram and each operation of the flow chart may be derived from computer program instructions. Because the computer program instructions may be loaded on a general purpose computer, a special purpose computer, or a processor of programmable data processing equipment, the instructions performed through the computer or the processor of the programmable data processing equipment may generate the means performing functions described in the each block of the block diagram and each operation of the flow chart. Because the computer program instructions may be stored in computer readable memory or a memory usable in a computer which is capable of intending to a computer or other programmable data processing equipment in order to embody a function in a specific way, the instructions stored in the computer usable memory or computer readable memory may produce a manufactured item involving the instruction means performing functions described in the each block of the block diagram and each operation of the flow chart. Because the computer program instructions may be loaded on the computer or other programmable data processing equipment, the instructions derived from the computer or programmable data processing equipment may provide the operations for executing the functions described in the each block of the block diagram and each operation of the flow chart by a series of functional operations being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. A method for an optical fingerprint recognition, the method comprising:
   scanning a fingerprint image separately using a multiple exposure which allows alternating a short exposure and a normal exposure;
   determining whether there is an inflow of external light depending on a darkness level of a fingerprint image derived from the normal exposure among a plurality of scanned finger print images; and
   performing a fingerprint recognition using at least one of the scanned fingerprint images derived from the short exposure or the fingerprint image derived from the normal exposure in accordance with the determination result as to the inflow of external light;
   wherein said performing a fingerprint recognition comprises:
   straightly applying the fingerprint image derived from the short exposure to the fingerprint recognition.

2. The method of claim 1, wherein said scanning a fingerprint image separately comprises:
   scanning the fingerprint image separately with the short exposure and the normal exposure within one frame.

3. The method of claim 1, wherein said scanning a fingerprint image separately comprises:
   scanning the fingerprint image separately in an alternating fashion of the short exposure and the normal exposure in a frame unit.

4. The method of claim 1, wherein said performing a fingerprint recognition comprises:
   synthesizing the fingerprint image derived from the short exposure and the fingerprint image derived from the normal exposure; and
   applying the synthesized fingerprint image to the fingerprint recognition.

5. A method for an optical fingerprint recognition, the method comprising:
   scanning a fingerprint image separately using a multiple exposure which allows alternating a short exposure and a normal exposure;
   determining whether there is an inflow of external light depending on a darkness level of a fingerprint image derived from the normal exposure among a plurality of scanned finger print images; and
   performing a fingerprint recognition using at least one of the scanned fingerprint images derived from the short exposure or the fingerprint image derived from the normal exposure in accordance with the determination result as to the inflow of external light;
   wherein said performing a fingerprint recognition comprises:

defining a following exposure time using the difference between the fingerprint image derived from the short exposure and the fingerprint image derived from the normal exposure;

scanning a fingerprint image newly in compliance with a scan condition taking the following exposure time; and applying the newly scanned fingerprint image to the fingerprint recognition.

6. The apparatus for an optical fingerprint recognition, the apparatus comprising:

a fingerprint image scanning unit configured to scan a fingerprint image separately using a multiple exposure;

a scan condition setting unit configured to set a scan condition allowing to alternate a short exposure and a normal exposure at the time of scanning the fingerprint image;

an image determination unit configured to determine whether there is an inflow of external light depending on a darkness level of a fingerprint image derived from the normal exposure among a plurality of scanned fingerprint images; and a fingerprint recognition module configured to perform a fingerprint recognition using at least one of the scanned fingerprint images derived from the short exposure or the fingerprint image derived from the normal exposure in accordance with the determination result as to the inflow of external light;

wherein the fingerprint recognition module is configured to apply straightly the fingerprint image derived from the short exposure to the fingerprint recognition.

7. The apparatus of claim 6, wherein the fingerprint image scanning unit is configured to scan the fingerprint image separately with the short exposure and the normal exposure within one frame.

8. The apparatus of claim 6, wherein the fingerprint image scanning unit is configured to scan the fingerprint image separately in an alternating fashion of the short exposure and the normal exposure in a frame unit.

9. The apparatus of claim 6, wherein the fingerprint recognition module is configured to synthesize the fingerprint image derived from the short exposure and the fingerprint image derived from the normal exposure to apply the synthesized fingerprint image to the fingerprint recognition.

10. An apparatus for an optical fingerprint recognition, the apparatus comprising:

a fingerprint image scanning unit configured to scan a fingerprint image separately using a multiple exposure;

a scan condition setting unit configured to set a scan condition allowing to alternate a short exposure and a normal exposure at the time of scanning the fingerprint image;

an image determination unit configured to determine whether there is an inflow of external light depending on a darkness level of a fingerprint image derived from the normal exposure among a plurality of scanned fingerprint images; and a fingerprint recognition module configured to perform a fingerprint recognition using at least one of the scanned fingerprint images derived from the short exposure or the fingerprint image derived from the normal exposure in accordance with the determination result as to the inflow of external light;

wherein the fingerprint recognition module is configured to define a following exposure time using the difference between the fingerprint image derived from the short exposure and the fingerprint image derived from the normal exposure and apply a newly scanned fingerprint image, that has been scanned newly by the fingerprint image scanning unit in compliance with a scan condition taking the following exposure time, to the fingerprint recognition.

* * * * *